(12) United States Patent
Köppel et al.

(10) Patent No.: US 9,743,686 B2
(45) Date of Patent: Aug. 29, 2017

(54) PASTEURIZING APPARATUS

(71) Applicant: KHS GmbH, Dortmund (DE)

(72) Inventors: Frank Köppel, Unna (DE); Aco Todoroski, Unna (DE)

(73) Assignee: KHS GmbH, Dortmund (DE)

( * ) Notice: Subject to any disclaimer, the term of this patent is extended or adjusted under 35 U.S.C. 154(b) by 309 days.

(21) Appl. No.: 14/389,845

(22) PCT Filed: Mar. 20, 2013

(86) PCT No.: PCT/EP2013/000835
§ 371 (c)(1),
(2) Date: Oct. 1, 2014

(87) PCT Pub. No.: WO2013/149702
PCT Pub. Date: Oct. 10, 2013

(65) Prior Publication Data
US 2015/0059596 A1 Mar. 5, 2015

(30) Foreign Application Priority Data

Apr. 4, 2012 (DE) .................. 10 2012 006 742

(51) Int. Cl.
*A23L 3/00* (2006.01)
*A23L 3/02* (2006.01)
*A23L 3/04* (2006.01)

(52) U.S. Cl.
CPC .................. *A23L 3/02* (2013.01); *A23L 3/001* (2013.01); *A23L 3/003* (2013.01); *A23L 3/04* (2013.01)

(58) Field of Classification Search
CPC ... A23L 3/04; A23L 3/02; A23L 3/001; A23L 3/003
USPC ...... 99/326, 330, 443 C, 453, 487, 516, 517
See application file for complete search history.

(56) References Cited

U.S. PATENT DOCUMENTS

| | | | | |
|---|---|---|---|---|
| 4,279,858 A | * | 7/1981 | Huling | A23L 3/04 422/105 |
| 4,704,958 A | * | 11/1987 | Braymand | A23L 3/04 422/302 |
| 4,727,800 A | * | 3/1988 | Richmond | A23L 3/003 422/304 |

(Continued)

FOREIGN PATENT DOCUMENTS

| | | |
|---|---|---|
| DE | 3637661 | 5/1987 |
| DE | 253938 | 2/1988 |

(Continued)

*Primary Examiner* — Reginald L Alexander
(74) *Attorney, Agent, or Firm* — Occhiuti & Rohlicek LLP

(57) ABSTRACT

A container-processing apparatus includes a pasteurizer with plural zones, and a transport element. The zones, which follow one another in a transport direction, include a preheating set, a cooling set, and pasteurizing set. The transport element moves containers through the sets, where they are subjected to a treatment medium at different treatment temperatures. Treatment temperatures in zones in the preheating set rise in steps from zone to zone. In the pasteurizing set, treatment temperature is maintained at or above pasteurizing temperature. In the cooling set, treatment temperatures decrease in steps zone to zone. The transport element transports containers in the pasteurizer at a changeable transport speed that is subject to continuous control.

13 Claims, 4 Drawing Sheets

(56) References Cited

U.S. PATENT DOCUMENTS

| | | | |
|---|---|---|---|
| 5,189,948 A * | 3/1993 | Liebermann | A47J 27/18 |
| | | | 134/131 |
| 6,588,327 B2 * | 7/2003 | Wakabayashi | A23L 3/003 |
| | | | 99/367 |
| 7,281,470 B2 * | 10/2007 | Franck | A23B 4/0056 |
| | | | 99/362 |
| 7,993,603 B2 * | 8/2011 | Amedeo | A23L 3/01 |
| | | | 422/21 |
| 2005/0263172 A1 | 12/2005 | Lewis | |
| 2006/0040029 A1 | 2/2006 | Gunawardena | |

FOREIGN PATENT DOCUMENTS

| | | |
|---|---|---|
| DE | 19908035 | 8/2000 |
| DE | 10 2010 020429 | 11/2011 |
| EP | 0437499 | 7/1991 |
| JP | H0819386 | 1/1996 |
| JP | H10225503 | 8/1998 |
| JP | 2009073560 | 4/2009 |
| JP | 2011046389 | 3/2011 |

\* cited by examiner

PASTEURIZING APPARATUS

RELATED APPLICATIONS

This application is the national stage entry under 35 USC 371 of PCT/EP2013/000835, filed on Mar. 20, 2013, which claims the benefit of the Apr. 4, 2012 priority date of DE 102012006742.9, the contents of which are herein incorporated by reference.

FIELD OF DISCLOSURE

The invention relates to a pasteurizing apparatus or a pasteurizer.

BACKGROUND

Pasteurizers for the pasteurization of liquid contents, for example of containers filled with liquid contents, such as bottles, are known. Usually, a pasteurizer has a transport element formed from a conveyor belt. The belt moves containers in a transport direction through a plurality of zones of the pasteurizer. These zones follow one another and are separated from each other.

Within the zones, the containers are subjected to a warmed or heated liquid treatment medium, such as water. A first group of zones, which follows a container intake in the transport direction, is used for preheating. In order to increase the rate at which containers heat, the temperature of the treatment medium rises in steps from one zone to the next. Actual pasteurizing occurs within a group of zones that follows the preheating zones in the transport direction. In these pasteurizing zones, containers are subjected to a liquid treatment medium that has been heated to a pasteurizing temperature. The next and last zones in the transport direction are cooling zones in which the temperature of the treatment medium decreases step by step.

The treatment temperatures in the individual zones, and, in particular, in the zones that serve as pasteurizing zones, are adjusted in such a way that, by taking account the transport speed of the transport element, including in particular the dwell or treatment duration of the containers, each container is pasteurized in the proper manner. The curve of the treatment temperatures is adjusted in such a way that not only is an adequate pasteurization of the containers guaranteed, but the process itself adjusted in such a way that over-pasteurization is avoided, thus avoiding impairment of the taste quality of the contents.

Known pasteurizers are designed such that, during their operation, the transport speed of internal transport elements is constant or essentially constant. As a result, the treatment and dwell times of the containers in the pasteurizer, and the time containers spend in other zones, is also constant.

A pasteurizer is usually part of a system that carries out other container processing functions, such as filling, closing, equipping, or labeling containers.

Faults or any necessary reduction in performance or throughput within the parts of the overall system located upstream of the pasteurizer, for example inside the filling machine, often lead to a product deficiency, i.e. a deficiency of containers in a sector of the pasteurizer.

Conversely, faults or any necessary reduction in performance within the parts of the overall system located downstream of the pasteurizer, for example in a labeling machine or in a packing system, frequently lead to a product jam that extends outwards from the point of the fault. These jams can extend into the pasteurizer.

In the latter case, when a jam backs up into the pasteurizer, it can be necessary to switch off the transport element. This creates a risk of over-pasteurizing, which can impair product quality.

Even if a deficiency or product jam can be identified early, for example by a superordinate control device that controls the entire system, the conventional solution is to stop further inlet of containers into the pasteurizer or to allow the pasteurizer to run empty to rectify the production fault. As a result, no further containers are moved through the pasteurizer or its zones, and the drive of the pasteurizer is switched off. Such machine standstills cause, among other things, high energy and water consumption.

Known pasteurizers address these deficiencies by switching the transport element inside the pasteurizer on and off, and/or by controlling the quantity admitted into the zones in each case to accord with the treatment medium or liquid. These adjustments to production interruptions and/or production disturbances can be put into effect by the system control arrangement or by jam switches, which are provided on transporters of the system as a whole and/or downstream of the pasteurizer.

SUMMARY

An object of the invention is to provide a pasteurizing apparatus, i.e. a pasteurizer, that, with high operational reliability, even during ongoing production, without a production stop or machine stop, will allow for a continuous or dynamic adjustment of the dwell time of the containers inside the pasteurizer as a function of the current operational state of the system as a whole, thereby reducing the risk of inadequate pasteurization or over-pasteurization.

A particular feature of the pasteurizer according to the invention is the fact that the transport speed of the transport element inside the pasteurizer, and therefore the dwell time of the containers in the pasteurizer, are steplessly, i.e. continuously, controllable or regulatable. This permits dynamic adjustment of the current operational state of the system as a whole, and also permits adjustment to the operational states of such areas of the system as a whole that are upstream and/or downstream of the pasteurizer in the transport direction of the containers. The regulation and/or controlling of the transport speed of the transport element inside the pasteurizer or of the pasteurizer itself is possible steplessly within wide limits, for example between 0% and 130% of a rated transport speed, and preferably between 20% and 120% of this rated transport speed.

In order to maintain the conditions required for the pasteurization, i.e. in order to avoid deficient pasteurization or over-pasteurization, the invention further makes provision, at least in some zones of the pasteurizer, and in this situation in particular in the zones that serve as pasteurizing zones during the rated nominal operation of the pasteurizer, as a function of the transport speed of the transport element inside the pasteurizer, for a change to be effected in the treatment temperature, and specifically equidirectional with this change in the transport speed. If the transport speed increases, then, at least in one zone, its treatment temperature, i.e. the temperature of the liquid treatment medium being applied to the containers, will be increased. If the transport speed is reduced, then, at least in one zone, the treatment temperature, i.e. the temperature of the liquid treatment medium being applied to the containers, will be reduced. This adjustment of the treatment temperatures takes place in this situation preferably in such zones that, at nominal rated operation of the pasteurizer, form the pasteurizing zones. By the control and/or regulation of the treatment temperatures, definite and reproducible conditions can be attained even at different transport speeds of the transport element inside the pasteurizer.

The invention is based on the recognition that the pasteurization units must be applied in the period of time or dwell time of the containers available in each case and dependent on the transport speed of the transport element inside the pasteurizer, inside the pasteurization zones, which at higher transport speed of the transport element inside the pasteurizer, and the shorter dwell time of the containers associated with this, can be achieved by increasing the treatment temperature and/or by increasing the number of the zones with high treatment temperature, and, conversely, with reduced transport speed of the pasteurizer and therefore increased dwell time of the containers, can be achieved by reducing the treatment temperature and/or the number of zones with high treatment temperatures.

By the dynamic regulation of the transport speed with adaptive adjustment of the treatment temperatures, the pasteurizer according to the invention is capable of adjusting to constantly changing situations or operational states of the system as a whole, in particular in such a way that, with respect to its performance or to the transport speed of the transport element inside the pasteurizer, as a regulatable or controllable part of the system as a whole, it follows the performance and/or the production speed of the system as a whole.

In one aspect, the invention features an apparatus for container processing. Such an apparatus includes a pasteurizer for pasteurization of containers filled with contents. The pasteurizer has plural zones, and a transport element. The zones, which follow one another in a transport direction, include a preheating set, a cooling set, and pasteurizing set, each of which includes at least one zone. The membership roster of zones in a set will be variable and will depend on circumstances in which the apparatus operates. The transport element moves containers along the transport direction through the sets. The containers are subjected to a liquid treatment medium at different treatment temperatures. Treatment temperatures in zones in the preheating set rise in steps from zone to zone in the transport direction. In the pasteurizing set, treatment temperature is maintained at or above a pasteurizing temperature. In the cooling set, treatment temperatures decrease in steps from zone to zone in the transport direction. The transport element transports containers in the pasteurizer at a changeable transport speed that is subject to continuous control.

In some embodiments, the contents comprise liquid contents and the apparatus is configured to handle containers with liquid contents.

In other embodiments, the treatment temperatures, in at least of some zones, can be continuously changed in response to changes in the transport speed of the transport element inside the pasteurizer such that, despite a change in transport speed, no change occurs in pasteurization conditions.

Also included are embodiments in which a temperature course of the zones can be continuously changed in response to changes in the transport speed of the transport element inside the pasteurizer such that, despite a change in transport speed, no change occurs in pasteurization conditions.

Embodiments include those in which a die transport speed of the transport element inside the pasteurizer can be controlled to be between 0% and 130% of a nominal transport speed. Among these are embodiments in which a transport speed of the transport element inside the pasteurizer can be controlled to be between 20% and 120% of the nominal transport speed.

Some embodiments further include a controller, a downstream machine, and an upstream machine, wherein the pasteurizer is disposed between the downstream machine and the upstream machine. In these embodiments, the controller is configured to control the transport speed in response to operational state of the upstream machine.

In some embodiments, a controller is configured to respond to an increase in transport speed by reducing cardinality of zones in the preheating set, increasing treatment temperature in the zones in the preheating set, and increasing a cardinality of zones in the pasteurizing set.

In other embodiments, a controller is configured to respond to a reduction in transport speed by increasing a cardinality of zones in the preheating set, reducing treatment temperatures in those zones, and reducing a cardinality of zones in the pasteurizing set.

Also included are embodiments in which a cardinality of zones in the cooling set is held constant regardless of changes in transport speed.

Embodiments further include those in which, for zones in the cooling set, an adjustment of treatment temperatures is effected by taking account of the transport speed and a desired temperature of the containers at an outlet of the pasteurizer, as well as those in which, for zones in the cooling set, an adjustment of quantity of the treatment medium applied onto the containers is effected by taking account of the transport speed and a desired temperature of the containers at an outlet of the pasteurizer.

As used herein, "treatment temperature" means the temperature of the liquid treatment medium applied onto the containers in a zone of the pasteurizer, for example the temperature of the water being used as the treatment medium.

As used herein, "transport speed of the pasteurizer" means the transport speed of the transport element inside the pasteurizer.

As used herein, "pasteurization zones" are zones of the pasteurizer in which the containers are subjected to the treatment medium heated to a pasteurizing temperature, for example to a temperature between 60° C. and 75° C., and for example to a temperature of substantially 61.4° C.

As used herein, "nominal rated operation of the pasteurizer" means that operating state of the pasteurizer in which the containers move through the pasteurizer at a nominal transport speed corresponding to this rated operation, and also, the treatment temperatures in the zones, including, in particular, the treatment temperatures in the pasteurization zones, which are adjusted in such a way that the required number of warming or pasteurizing units are applied to each container at the nominal transport speed, such that the required pasteurization is attained but over-pasteurization is prevented.

As used herein, the expressions "essentially" and "some" mean deviations from an exact value by ±10%, preferably by ±5%, and/or deviations in the form of changes that are not of significance for the function.

Further embodiments, advantages, and application possibilities of the invention can also be derived from the following description of embodiments and from the figures. In this context, all the features described and/or represented in image form, individually or in a desired combination, are in principle available for defining the subject matter of the invention, regardless of their being summarized in the claims or back reference being made to them. The contents of the claims are also established as being constituent parts of the description.

BRIEF DESCRIPTION OF THE DRAWINGS

The invention is explained in greater details hereinafter on the basis of the Figures, by way of an exemplary embodiment. In the drawings.

DETAILED DESCRIPTION

Figure 1:
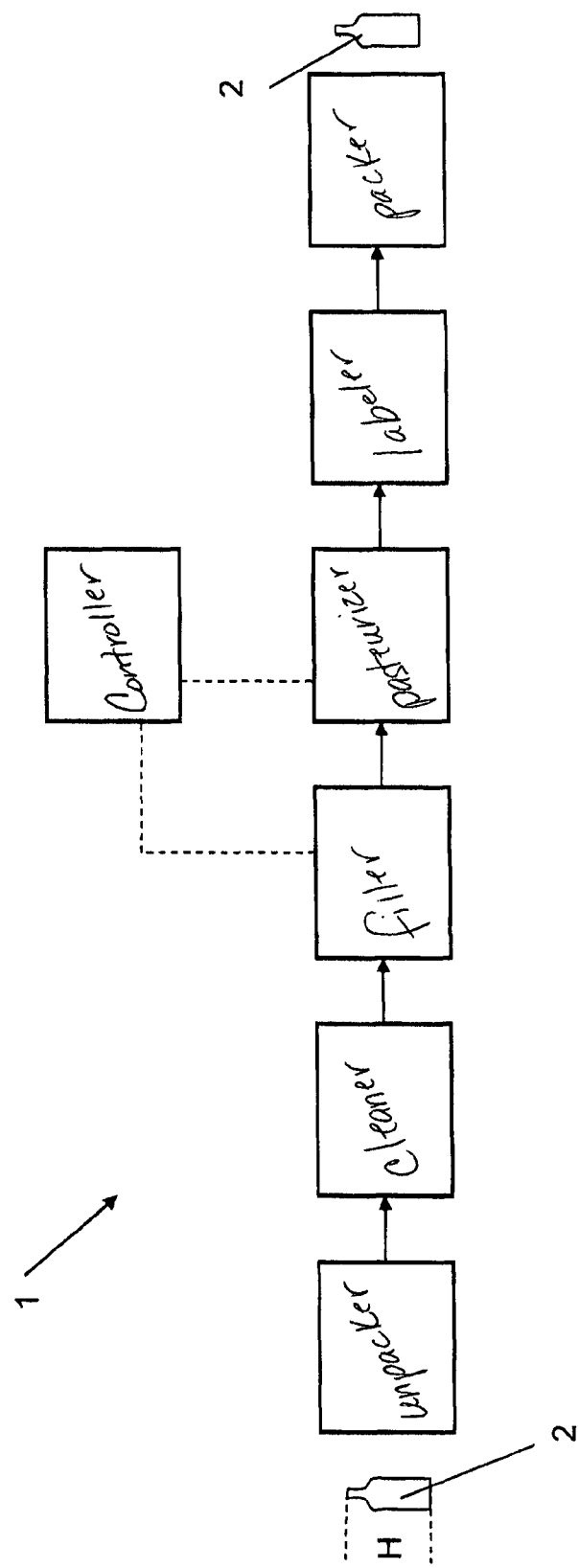
FIG. 1 shows a schematic functional representation of a system for filing containers, such as bottles, with liquid contents, with a multi-step pasteurizer integrated into the system.

Referring to FIG. 1, a system 1 fills containers 2, such as bottles, with liquid contents for subsequent closure, pasteurization, and equipping, i.e., for example, labeling of the filled containers 2. The system 1 comprises an unpacker 3 for introducing the containers 2 into the system 1, a cleaning machine 4 for cleaning and/or sterilizing of the containers 2, a filling and closing machine 5 for filling and closing the containers 2, a pasteurizer 6 for pasteurizing the containers 2 and the contents thereof, a labeling machine 7, and a packer 8 for bringing the filled, closed, and labeled containers 2 into packing units or larger containers. The machines referred to are connected to one another in a sequence that defines how containers 2 are moved through the system along a transport direction A with the use of suitable transporters or transport elements.

The pasteurizer 6 permits dynamic and adapted regulation of the transport speed at which the containers 2 are moved through the pasteurizer 6. This permits dynamic and adapted regulation of the treatment duration of the containers 2 inside the pasteurizer 6. The pasteurizer 6 also allows for a dynamic regulating or controlling the treatment temperatures of its treatment zones as a function of the operational state of the system 1, and in particular, as a function of treatment durations.

The controlling and/or regulating of the transport speed of the pasteurizer 6 and, respectively, of the treatment duration and treatment temperatures or of the temperature profile of the pasteurizer 6 take place as a function of the operational state of a critical system component or bottleneck component, for example as a function of the operational state of the filling and closing machine 5. The controlling and/or regulating of the transport speed of the pasteurizer 6 and, respectively, of the treatment duration and the treatment temperatures take place in such a way that each container 2 is adequately pasteurized and not over-pasteurized. This means that each container 2 is full subjected to the required pasteurizing units required.

In particular, controlling the treatment temperatures of the pasteurizer 6 as a function of the transport speed takes place by having the pasteurization units to which the containers are subjected be calculated together during the entire treatment process. Therefore, among other things, the treatment temperatures required are determined by taking account the treatment time that remains available.

Further, the control of the pasteurizer 6 is effected in such a way that, in the event of a container jam in a system component that is downstream of the pasteurizer 6 in the transport direction A (e.g. in the labeling zone 7 and/or in the packer 8), the transport speed of the containers 2 is reduced by the pasteurizer 6 or its treatment zone respectively, and the treatment duration thereby increased, with the reduction in the same direction of the treatment temperature in a number of zones of the pasteurizer 6, and therefore the simultaneous change of the temperature profile. In the event of gaps in the containers inside the pasteurizer 6 and/or in the part of the system 1 downstream of the pasteurizer 6, the transport speed of the pasteurizer 6 is increased, with the simultaneous increase in the treatment temperature in some zones of the pasteurizer 6 and, respectively, with the simultaneous change of the temperature profile inside the pasteurizer 6. In this sense it is possible, for example, for the transport speed of the pasteurizer 6 to be regulated in one area to between 20% and 120% of the nominal transport speed without this exerting a negative influence on the pasteurization process. In this situation it is always ensured that all the required pasteurization conditions are maintained, and every container 2 is subjected to the required number of pasteurization units.

Figure 2:
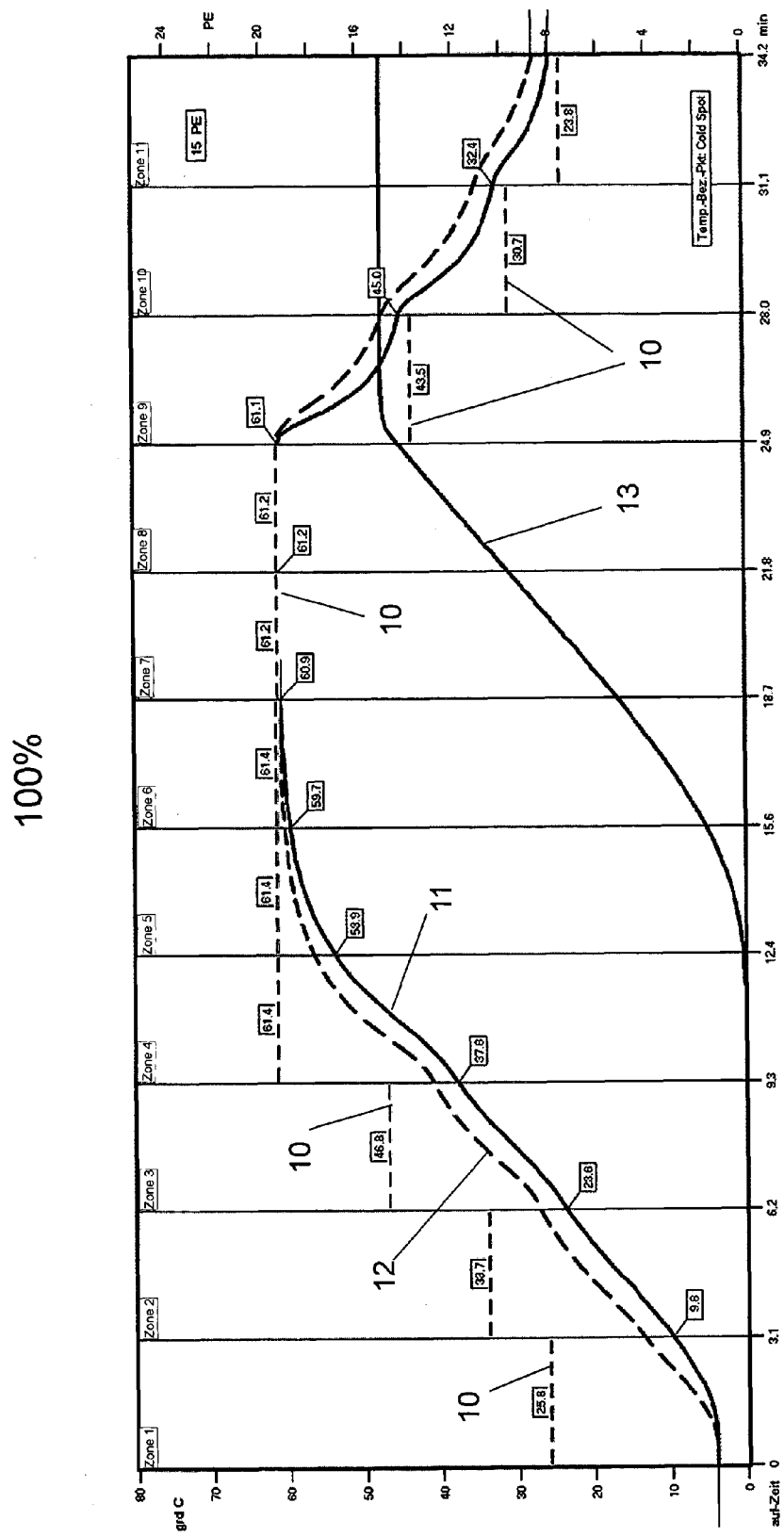
FIGS. 2-4 are temperature-time diagrams showing the temperature curve of the containers as they pass through the zones of the pasteurizer at different transport speeds of the pasteurizer.

In FIG. 2, the treatment temperatures within the eleven treatment zones of a pasteurizer 6 are represented by broken line 10. The broken line 10 represents temperatures of the liquid treatment medium (water) in each zone through which the containers 2 pass through at a transport speed that corresponds to 100% of a nominal transport speed. The solid line 11 in FIG. 2 reproduces the temperature course at the "cold spot" of the container 2. The term "cold spot" is a point in the interior of the container that lies on the horizontal mid-axis of the container. In the illustrated embodiment, the cold spot is 10 mm from the base of the container when the container 2 stands upright with its container base on the transport element or transport belt of the pasteurizer 6.

The broken line 12 reproduces the temperature curve at a point in the interior of the container 2 that represents the container temperature. This point lies on the horizontal mid-axis of the container and is located at a height of one-third of the filling height H of the contents filled into the container. The curve 13 represents the increase in the pasteurization units to which the respective container 2 is subjected during the treatment.

As can be seen from the lines 10 in FIG. 2, the treatment temperature rises in steps along zones 1-4 up to a pasteurizing temperature of some 61.4° C. The treatment temperature then remains constant in zones 4-6, and falls in steps in zones 9-11 until it reaches the initial temperature, which in the figure is 24° C.

As the curves 11 and 12 show, in the treatment zones 1-5 an increasing warming of the containers 2 takes place. During this stage, the container temperature attains the pasteurizing temperature of 61.4° C. as early as inside zone 6. With regard to the treatment temperature, zones 1-3 form pre-treatment or heating-up zones. Zones 4-8, which are at the treatment temperature of 61.4° C., define pasteurization zones, and zones 9-11 are cooling zones.

As the curve 13 shows, the pasteurization of the containers 2 takes place essentially in zones 5-8 and is concluded in zones 9-11. The containers 2 have, by then, been subjected to the necessary number of pasteurization units.

Figure 3:
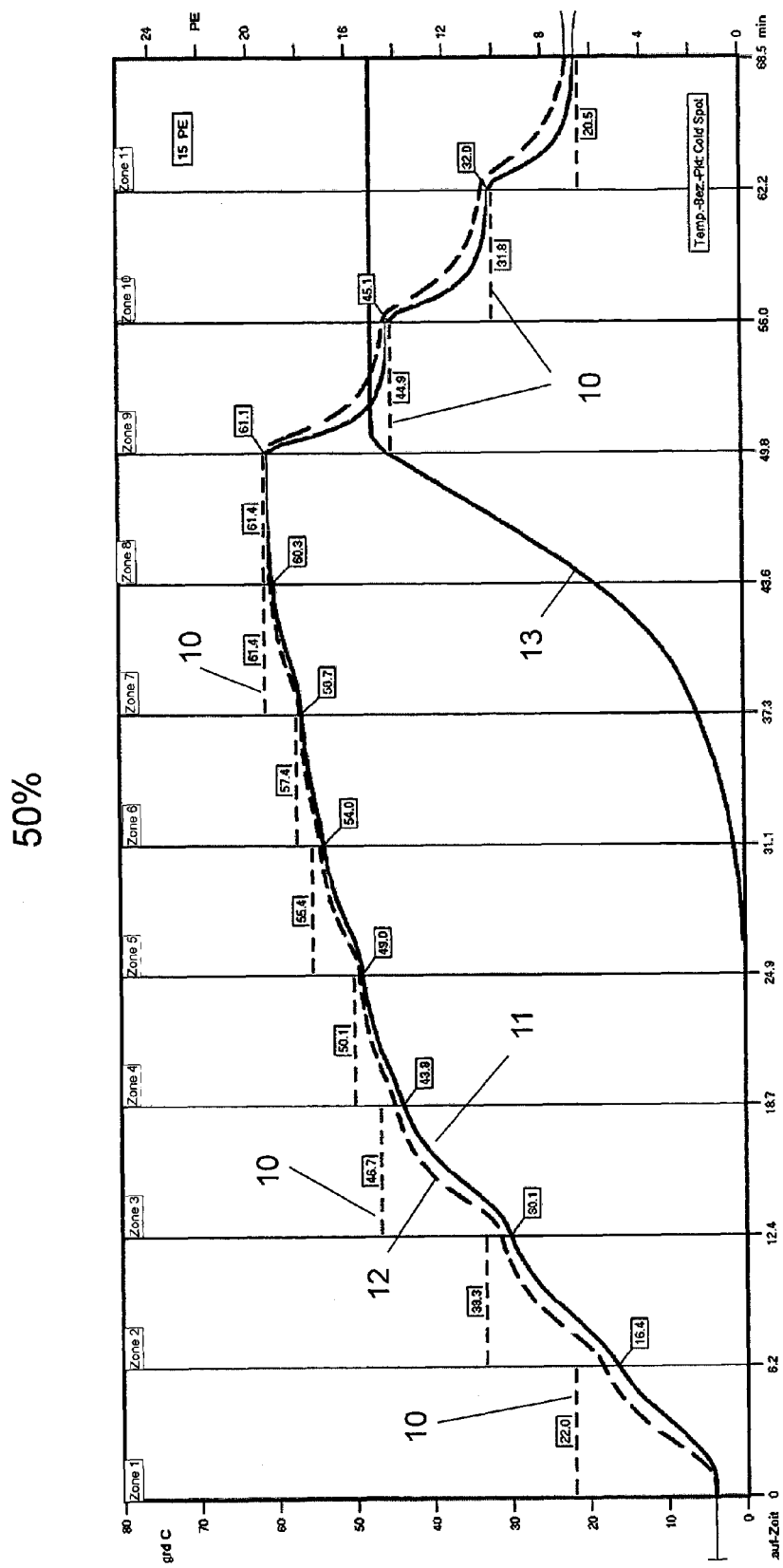

The broken line 10 in FIG. 3 shows the treatment temperature in the individual treatment zones when the transport speed of the pasteurizer 6 has been reduced to 50% of the nominal transport speed, thus resulting in a treatment duration that is perceptibly higher than that shown in FIG. 2. As is shown in FIG. 3, the treatment temperature rises in steps in zones 1-7, and first attains the pasteurizing temperature of 61.4° C. in zone 7. In zones 7 and 8 the treatment temperature remains constant at the pasteurizing temperature. In this case, it is zones 7 and 8 that are pasteurization zones. Zones 9-11 again form the cooling zones in which the treatment temperature drops off in steps to the initial temperature, which in the example shown is about 20° C.

As the curves 11 and 12 show, in this operational state of the pasteurizer 6, a constant warming of the containers 2 takes place in zones 1-6. Thus, zones 1-6 serve as preheating zones. The container temperature actually first attains the pasteurizing temperature of 61.4° C. only in zone 8.

Figure 4:
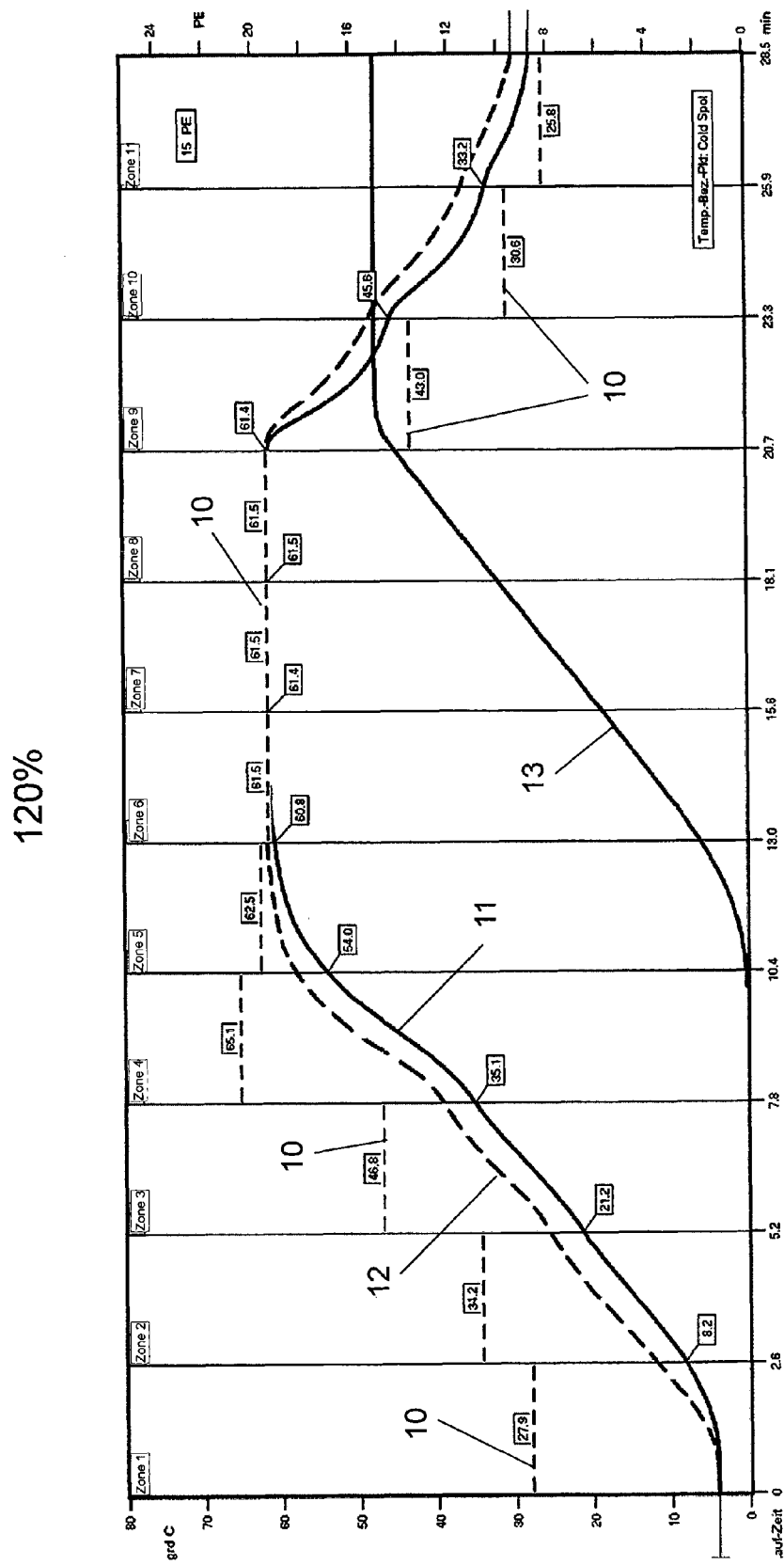

The curve in FIG. 4 shows treatment temperatures at an increased transport speed of the pasteurizer 6. In the particular example of FIG. 4, the transport speed is 120% of the nominal transport speed. As is indicated by the broken lines 10, the treatment temperature increases in steps in zones 1-4 in such a way that the treatment temperature in zone 4 is above the pasteurizing temperature of 61.5° C. In zones 5 and 6, the treatment temperature steps down to the pasteurizing temperature of 61.5° C., which is then maintained in zones 6-8. In zones 9-11, the treatment temperature steps down to the initial temperature, for example to the initial temperature of some 27° C.

As the course of the curves 11 and 12 shows, the temperature of the containers 2 rises in zones 1-5 until, in zone 6, it attains the sterilization temperature of 61.5° C. The temperature remains constant in zones 6-8. In zones 9-11 a cooling of the temperature of the containers 2 again takes place. As the curve 13 shows, the imposition on the containers 2 of the pasteurization units begins at this increased transport speed of the pasteurizer 6 as early as at the end of zone 4, and at the end of zone 5 has already reached a significant value.

The foregoing explanations have shown that, with the dynamic regulating or controlling of the transport speed of the pasteurizer 6, not only are the treatment temperatures of the different zones of the pasteurizer 6 changed in the same direction with the change of the transport speed, but the function of the zones also changes. Thus, a particular zone can serve either as a cooling zone, a preheating zone, or a pasteurizing zone depending on the particular treatment temperature profile.

Accordingly, at the nominal transport speed of the pasteurizer 6, according to FIG. 2, a total of five zones, namely zones 4-6 impose the pasteurizing temperature of 61.4° C. on the containers 2. When the transport speed is reduced to 50% of the nominal transport speed, the containers 2 are only subjected to the pasteurizing temperature of 61.4° C. in two zones, namely zones 4-6. When the transport speed is increased to 120% of the nominal transport speed, the containers 2 are subjected a treatment temperature in both zones 6 to 8, and also in zones 4 and 5, that is above the pasteurizing temperature of 61.5° C. This increase of the treatment temperature in zones 4 and 5 accelerates the warming of the containers 2 so that the pasteurization of the containers 2 already begins as early as in the area of zone 5, as the course of the curve 13 shows.

A comparison of FIGS. 2-4 further shows that the adjustment of the treatment temperatures or, respectively, of the course of the treatment temperatures, to the transport speed of the pasteurizer 6 takes place essentially in such zones, i.e. in the embodiment shown in zones 4-7, in which, at the nominal transport speed (FIG. 2), the treatment temperatures correspond to the pasteurizing temperature of 61.4° C. At the rated transport speed, these zones are pasteurization zones. In the preceding preheating zones, which, in the embodiment shown, consist of zones 1-3, no substantial change or adjustment takes place of the treatment temperature takes place in response to the changed transport speed of the pasteurizer 6.

The treatment temperatures in zones 9-11, which serve as cooling zones, correspond in principle to the required discharge temperature, i.e. the temperature of the containers 2 at their discharge from the pasteurizer 6, adjusted in such a way that the respective discharge or initial temperature are always guaranteed with the lowest possible consumption of cold. In detail, with the embodiment shown, the course of the treatment temperatures in zones 9-11, which serve as cooling zones, is selected in such a way that the treatment temperatures, independently of the transport speed of the pasteurizer 6, drop off in equal steps or in essentially equal steps as they step down to the temperature at the outlet of the pasteurizer 6. Because the number of zones that serve as cooling zones is a function of the transport speed of the pasteurizer 6, it may be useful, in order to attain a consistent initial temperature of the containers 2, for adjustment to be made in zones 9-11 to the temperature and/or to the quantity of the treatment medium applied onto the containers 2, taking account the transport speed and the desired or required temperature of the containers 2 at the outlet of the pasteurizer 6.

As a result of the reduction of the transport speed of the pasteurizer 6, more time is available for the cooling of the containers 2 following the heat treatment, such that the cooling down process which takes place in zones 9-11 can be arranged more precisely and with greater energy efficiency. The initial or discharge temperature can, as a result of the prolonged period of effect of the treatment liquid on the containers 2, be attained with a smaller temperature gradient, as a result of which substantial energy savings can be achieved.

The invention has been described heretofore on the basis of an embodiment. It is understood that numerous changes and divergences are possible without thereby departing from the inventive thinking on which the invention is based.

Having described the invention, and a preferred embodiment thereof, what we claim as new, and secured by letters patent is:

1. An apparatus for container processing, said apparatus comprising a pasteurizer for pasteurization of containers filled with contents, said pasteurizer comprising a plurality of zones, and a transport element, wherein said zones follow one another in a transport direction, wherein said zones comprise a preheating set having at least one preheating zone, a cooling set having at least one cooling zone, and a pasteurizing set comprising at least one pasteurizing zone, wherein said transport element moves containers along said transport direction through said sets, wherein said containers are subjected to a liquid treatment medium at different treatment temperatures, wherein treatment temperatures in said preheating set rise in a stepwise manner in said transport direction, wherein, in said pasteurizing set, treatment temperature is at least at a pasteurizing temperature, wherein treatment temperatures in said cooling set decrease in a stepwise manner in said transport direction, wherein said transport element transports containers in said pasteurizer at a changeable transport speed, and wherein said transport speed is subject to continuous control, wherein said apparatus further comprises a controller configured to respond to an increase in transport speed by reducing a cardinality of zones in said preheating set, increasing treatment temperature in said zones in said preheating set, and increasing a cardinality of zones in said pasteurizing set.

2. The apparatus claim 1, wherein said contents comprise liquid contents.

3. The apparatus of claim 1, wherein treatment temperatures of at least of some zones can be continuously changed in response to changes in said transport speed of said transport element inside said pasteurizer such that, despite a change in transport speed, no change occurs in pasteurization conditions.

4. The apparatus of claim 1, wherein a temperature course of said zones can be continuously changed in response to changes in said transport speed of said transport element inside said pasteurizer such that, despite a change in transport speed, no change occurs in pasteurization conditions.

5. The apparatus of claim 1, wherein a die transport speed of said transport element inside said pasteurizer can be controlled to be between 0% and 130% of a nominal transport speed.

6. The apparatus of claim 1, wherein said transport speed of said transport element inside said pasteurizer can be controlled to be between 20% and 120% of said nominal transport speed.

7. The apparatus of claim 1, further comprising a downstream machine and an upstream machine, wherein said pasteurizer is disposed between said downstream machine and said upstream machine, wherein said controller is further configured to control said transport speed in response to operational state of said upstream machine.

8. The apparatus of claim 1, wherein said controller is further configured to respond to a reduction in transport speed by increasing a cardinality of zones in said preheating set, reducing treatment temperatures in said zones, and decreasing a cardinality of zones in said pasteurizing set.

9. The apparatus of claim 1, wherein a cardinality of zones in said cooling set is maintained constant regardless of changes in transport speed.

10. The apparatus of claim 1, wherein for zones in said cooling set, an adjustment of treatment temperatures is effected by taking account of said transport speed and a desired temperature of said containers at an outlet of said pasteurizer.

11. The apparatus of claim 1, wherein for zones in said cooling set, an adjustment of quantity of said treatment medium applied onto said containers is effected by taking account of said transport speed and a desired temperature of said containers at an outlet of said pasteurizer.

12. An apparatus for container processing, said apparatus comprising a pasteurizer for pasteurization of containers filled with contents, said pasteurizer comprising a plurality of zones, and a transport element, wherein said zones follow one another in a transport direction, wherein said zones comprise a preheating set having at least one preheating zone, a cooling set having at least one cooling zone, and a pasteurizing set comprising at least one pasteurizing zone, wherein said transport element moves containers along said transport direction through said sets, wherein said containers are subjected to a liquid treatment medium at different treatment temperatures, wherein treatment temperatures in said preheating set rise in a stepwise manner in said transport direction, wherein, in said pasteurizing set, treatment temperature is at least at a pasteurizing temperature, wherein treatment temperatures in said cooling set decrease in a stepwise manner in said transport direction, wherein said transport element transports containers in said pasteurizer at a changeable transport speed, and wherein said transport speed is subject to continuous control, said apparatus further comprising a controller, a downstream machine and an upstream machine, wherein said pasteurizer is disposed between said downstream machine and said upstream machine, wherein said controller is configured, to control said transport speed in response to operational state of said upstream machine.

13. An apparatus for container processing, said apparatus comprising a pasteurizer fir pasteurization of containers filled with contents, said pasteurizer comprising a plurality of zones, and a transport element, wherein said zones follow one another in a transport direction, wherein said zones comprise a preheating set having at least one preheating zone, a cooling set having at least one cooling zone, and a pasteurizing set comprising at least one pasteurizing zone, wherein said transport element moves containers along said transport direction through said sets, wherein said containers are subjected to a liquid treatment medium at different treatment temperatures, wherein treatment temperatures in said preheating set rise in a stepwise manner in said transport direction, wherein, in said pasteurizing set, treatment temperature is at least at a pasteurizing temperature, wherein treatment temperatures in said cooling set decrease in a stepwise manner in said transport direction, wherein said transport element transports containers in said pasteurizer at a changeable transport speed, and wherein said transport speed is subject to continuous control, said apparatus further comprising a controller configured to respond to a reduction in transport speed by increasing a cardinality of zones in said preheating set, reducing treatment temperatures in said zones, and decreasing a cardinality of zones in said pasteurizing set.

\* \* \* \* \*